US010715400B2

(12) United States Patent
Skelton et al.

(10) Patent No.: US 10,715,400 B2
(45) Date of Patent: Jul. 14, 2020

(54) SYSTEM AND METHODS UTILIZING DATASET MANAGEMENT USER INTERFACE

(71) Applicant: Spherica Systems Limited, Chipping Campden (GB)

(72) Inventors: Andrew Skelton, Gloucester (GB); Dan Clarke, Somerford Keynes (GB); Ben Reeves, Gloucester (GB)

(73) Assignee: Spherica Systems Limited, Chipping Campden (GB)

( * ) Notice: Subject to any disclaimer, the term of this patent is extended or adjusted under 35 U.S.C. 154(b) by 64 days.

(21) Appl. No.: 15/728,521

(22) Filed: Oct. 10, 2017

(65) Prior Publication Data

US 2019/0075031 A1  Mar. 7, 2019

(30) Foreign Application Priority Data

Sep. 7, 2017 (GB) .................................. 1714421.3

(51) Int. Cl.
*G06F 16/27* (2019.01)
*G06F 3/0481* (2013.01)
(Continued)

(52) U.S. Cl.
CPC ............ *H04L 41/22* (2013.01); *G06F 3/0482* (2013.01); *G06F 3/04817* (2013.01);
(Continued)

(58) Field of Classification Search
CPC ......... G06F 3/048; G06F 16/27; G06T 15/10; G08C 17/02
See application file for complete search history.

(56) References Cited

U.S. PATENT DOCUMENTS 5,841,439 A * 11/1998 Pose ...................... G06T 15/005
345/418
8,963,960 B2 * 2/2015 Gilra ....................... G09G 5/00
345/619

(Continued)

OTHER PUBLICATIONS

International Search Report of PCT Patent Application No. PCT/GB2018/052412 dated Dec. 4, 2018.

(Continued)

*Primary Examiner* — Li P Sun
*Assistant Examiner* — Qi Wan

(57) ABSTRACT

A method of remotely controlling a device at a location is provided. A dataset is received from each of a plurality of different locations, comprising at least one data value of at least one monitorable device at the respective location. Based on the dataset, a user interface can be generated, comprising a primary interface element having plurality of matrix positions mapped to a surface of a sphere. In the user interface, an interactive object icon is displayed which is representative of a monitorable device positioned at the respective matrix position. A scale of each interactive object icon is indicative of the data value of the said monitorable device. After receiving a user input at an interactive object icon, a processor retrieves and displays the data value of a monitorable device associated with the interactive object icon, and a device is controlled at the location to perform a physical function.

12 Claims, 4 Drawing Sheets

(51) Int. Cl.
  *G06F 3/0482*   (2013.01)
  *H04L 12/24*   (2006.01)
  *G08B 13/196*   (2006.01)
  *G08B 25/14*   (2006.01)

(52) U.S. Cl.
  CPC ....... G06F 16/27 (2019.01); G08B 13/19682 (2013.01); G08B 25/14 (2013.01)

(56) References Cited

U.S. PATENT DOCUMENTS

| | | | |
|---|---|---|---|
| 9,529,509 B1 | 12/2016 | Schmidt | |
| 9,711,038 B1* | 7/2017 | Pennebaker, III | G08C 17/02 |
| 2001/0028369 A1 | 10/2001 | Gallo et al. | |
| 2002/0097161 A1* | 7/2002 | Deeds | G01W 1/10 |
| | | | 340/601 |
| 2004/0032433 A1* | 2/2004 | Kodosky | G06F 3/04817 |
| | | | 715/810 |
| 2004/0102160 A1* | 5/2004 | Sleptchenko | G08C 17/02 |
| | | | 455/70 |
| 2005/0188079 A1* | 8/2005 | Motsinger | G06F 21/55 |
| | | | 709/224 |
| 2006/0031786 A1* | 2/2006 | Hillis | G06F 3/04883 |
| | | | 715/863 |
| 2006/0282416 A1* | 12/2006 | Gross | G06F 17/30864 |
| 2008/0134086 A1* | 6/2008 | Liao | G06F 3/0482 |
| | | | 715/810 |
| 2009/0293014 A1 | 11/2009 | Meuninck et al. | |
| 2010/0289759 A1* | 11/2010 | Fisher | G06F 3/0416 |
| | | | 345/173 |
| 2012/0072418 A1 | 3/2012 | Svendsen et al. | |
| 2012/0198376 A1* | 8/2012 | Martin | C21D 9/50 |
| | | | 715/771 |
| 2013/0187909 A1* | 7/2013 | Park | G06F 3/04815 |
| | | | 345/419 |
| 2013/0268890 A1* | 10/2013 | Jensen | G06Q 10/20 |
| | | | 715/825 |
| 2014/0033055 A1* | 1/2014 | Gardner | H04L 41/22 |
| | | | 715/736 |
| 2014/0047312 A1* | 2/2014 | Ruble | G06T 15/10 |
| | | | 715/212 |
| 2014/0075317 A1 | 3/2014 | Dugan et al. | |
| 2014/0143695 A1 | 5/2014 | Sundermeyer et al. | |
| 2014/0267226 A1* | 9/2014 | Yoon | G06T 11/206 |
| | | | 345/419 |
| 2014/0280039 A1* | 9/2014 | Bach | G01C 21/3611 |
| | | | 707/722 |
| 2014/0282266 A1 | 9/2014 | Brown et al. | |
| 2014/0305930 A1* | 10/2014 | Heizer | G08C 17/02 |
| | | | 219/539 |
| 2016/0092601 A1* | 3/2016 | Lamas | G06F 17/30991 |
| | | | 707/722 |
| 2016/0231909 A1 | 8/2016 | Olsson et al. | |
| 2017/0168805 A1* | 6/2017 | Yin | G06F 8/61 |

OTHER PUBLICATIONS

Search Report of British Patent Application No. 17144213 dated Feb. 5, 2018.

* cited by examiner

SYSTEM AND METHODS UTILIZING DATASET MANAGEMENT USER INTERFACE

CROSS REFERENCE TO RELATED APPLICATIONS

The present application claims the benefit of UK Patent Application No. 1714421.3 filed on Sep. 7, 2017. All the above are hereby incorporated by reference.

TECHNICAL FIELD

The present invention relates to a method of remotely controlling at least one device at a location, preferably but not necessarily exclusively to a method of controlling devices at a plurality of linked locations. A computer program product and database management system which can be used in connection with the method are also presented, as is a method of configuring a dataset management user interface based on a plurality of locations to be monitored.

BACKGROUND OF THE INVENTION

With the advent of greater and greater capability for accumulating data regarding a variety of different processes and/or objects, one of the most challenging aspects of dataset management is in the filtering and selection of important data from within a set, particularly in relation to the management of a plurality of different, physically separated locations. For example, for businesses which operate across a wide range of physically spaced apart locations, such as a national chain of shops, it can be extremely challenging to manage the data received from the variety of different stores in a meaningful way.

Furthermore, even where the data is available, there is often no internal normalisation of the data streams received from the different locations which must be monitored, and therefore it can be difficult to compare the data received which accounts for the regional variation.

This is particularly important in time-critical scenarios, such as where alarm events are being monitored and responses controlled from a central remote location across the entire range of locations. Each alarm system in each location may be configured in a different way, making assessment of whether an alarm triggered in one location is equivalent to a similar alarm in another location.

In addition to the above issues, it is challenging for a user in a central location to identify potential issues associated with the various locations in a proactive manner.

The present invention seeks to provide an improved means by which the monitorable devices can be controlled based on an associated dataset from a remote location, as well as a method of configuring the accompanying dataset management system for consistency over the entire set of locations. This arrangement serves to enhance the control of devices at a remote location.

SUMMARY OF THE INVENTION

According to a first aspect of the invention, there is provided a method of remotely controlling at least one device at a location, the method comprising the steps of: receiving a dataset from each of a plurality of different locations, each dataset comprising at least one data value of at least one monitorable device at the respective location; generating a user interface based on the dataset, the user interface comprising a primary interface element having a plurality of matrix positions mapped to a surface of a sphere, each of the plurality of matrix positions being associated with one of the plurality of different locations; displaying, in the user interface, an interactive object icon representative of a said monitorable device of each location positioned at the respective matrix position, wherein a scale of each interactive object icon is indicative of the data value of the said monitorable device; in response to receiving a user input at a said interactive object icon, causing a processor to retrieve and display the at least one data value of at least one monitorable device of the location associated with the interactive object icon; and controlling a said device at the location to perform a physical function at the location.

The provision of a method of providing interactive user icons within a spherical field allows for a user to control, visualise and/or manipulate large datasets without missing vital information. The modification of the interactive user icons based on input data provides a method of filtering out significant data values which need to be assessed by the user, which may be particularly important, for example, where the data being monitored is an alarm status for physical locations within a wider network of, for instance, shops or warehouses. The modification of the interactive user icons then permits the user direct and rapid access to the dataset associated with a relevant monitorable device from a remote and central location.

Preferably, the primary interface element may rotate in the user interface automatically to cyclically display all of the plurality of interactive object icons at the respective matrix positions. The rotation of the primary interface element may be halted upon user interaction therewith.

The shape and motion of the primary interface element is such that a large amount of data can be mapped in a user-friendly manner. Rotation of the sphere ensures a constant cycling of the visual field which allows the user to see interactive object icons which may be obscured in a stationary view, ensuring that critical information is not missed.

Preferably, the user interface may comprise at least one selection pane for selecting a monitorable device from a plurality of said monitorable devices, the interactive object icon being indicative of the selected monitorable device.

Since the matrix positions are mapped to locations, it can be advantageous to provide a means of selecting specific monitorable characteristics to affect the scale of the interactive object icons at any given time. This selection allows the user to rapidly confirm that all monitorable characteristics associated with a given location are acceptable or within predetermined limits, without needing to scour through lists of data.

In one preferred embodiment, the primary interface element may be a user-interactive object.

Manipulation of the primary interface element allows the user greater control over the visualisation of the sphere, and may enable particular features of interest associated with specific locations to be readily identified.

Optionally, the plurality of matrix positions may be mapped to an outer surface of the primary interface element. Additionally, or alternatively, the plurality of matrix positions may be mapped to an inner surface of the primary interface element. Furthermore, the user interface may be selectably configurable to view the interactive object icons from either the outer surface or the inner surface of the primary interface element.

The positioning of the matrix points can be arranged in accordance with a user- or computer-preferred viewing angle, and this may advantageously be informed by the dataset or datasets to be represented.

The method may further comprise using secondary indicia associated with one or more of the interactive object icons which is activatable under predetermined conditions. The said predetermined condition may be based on one or more historical dataset from each of a plurality of different locations which is indicative of an anomalous real-time data value.

The provision of secondary indicia may advantageously allow for the representation of information which could not otherwise be indicated, for example, the exceeding of a user-defined threshold for any given monitorable characteristic. This may provide additional information regarding the location being monitored, in turn enabling more effective control of the monitorable devices at the location, either by the user or automatically.

Preferably, each dataset may be received and updated periodically from the plurality of different locations.

Periodic updates to the dataset may advantageously ensure that critical conditions can be monitored and resolved in a timely manner, without overloading the computational capacity of either a central server or a user device utilised as part of the method.

Preferably, an arrangement of the plurality of matrix positions may be correlated with a geographic position of the locations associated therewith.

Whilst the arrangement of the matrix of data for the primary interface element may be random or pseudo-random, the control of the respective monitorable devices may be improved by providing the user with a geographic correlation between the location and the positioning of a corresponding interactive object icon.

According to a second aspect of the invention, there is provided a computer program product comprising a plurality of computer executable instructions stored on a computer readable storage device, the instructions causing a computer to perform the method of the first aspect of the invention.

According to a third aspect of the invention, there is provided a dataset management system comprising: at least one monitorable device positioned at each of a plurality of different locations; a server communicatively coupled with each monitorable device to receive a dataset from each monitorable device; a user device communicatively coupled with the server, the user device being adapted to display a user interface based on the dataset, the user interface comprising a primary interface element having a plurality of matrix positions mapped to a surface of a sphere, each of the plurality of matrix positions being associated with one of the plurality of different locations, the user interface having an interactive object icon representative of a said monitorable device of each location positioned at the respective matrix position, wherein a scale of each interactive object icon is indicative of the data value of the said monitorable device, and, in response to receiving a user input at a said interactive object icon, causing a processor to retrieve and display the at least one data value of at least one monitorable device of the location associated with the interactive object icon; the user device, via the user interface, allowing a user to control a said device at the location to perform a physical function at the location.

Preferably, the at least one monitorable device may be selected from: an alarm device; a temperature sensor; a light sensor; a pressure sensor; a motion sensor; and/or an electronic device having a monitorable activation status.

The dataset management system described allows the user to readily manipulate devices and/or associated datasets therefrom at a remote location quickly and effectively. This drastically improves the effectiveness of a manned monitoring service for any physically disparate network of locations, for example, a monitoring service across a set of retail locations, or a plurality of vehicles within a fleet of vehicles.

According to a fourth aspect of the invention, there is provided method implemented on a computer system, the method comprising the steps of: receiving a dataset from each of a plurality of different locations, each dataset comprising at least one data value of at least one monitorable characteristic of the respective location; generating a user interface based on the dataset, the user interface comprising a primary interface element having a plurality of matrix positions mapped to a surface of a sphere, each of the plurality of matrix positions being associated with one of the plurality of different locations; displaying, in the user interface, an interactive object icon representative of a selected said monitorable characteristic of each location positioned at the respective matrix position, wherein a scale of each interactive object icon is indicative of the data value of the selected said monitorable characteristic; and in response to receiving a user input at a said interactive object icon, causing a processor to retrieve and display the at least one data value of at least one monitorable characteristic of the location associated with the interactive object icon.

The provision of such a user interface enables a remote user to readily monitor a plurality of different locations having similar or identical monitorable devices, which may have time-critical outputs requiring response or intervention of some form. The user interface allows for outliers, anomalous and/or critical data values to be identified, and a response prepared accordingly.

According to a fifth aspect of the invention, there is provided a method of configuring a dataset management user interface based on a plurality of locations to be monitored, the method comprising the steps of: receiving a dataset from each of the plurality of different locations, each dataset comprising at least one data value of at least one monitorable device at the respective location, wherein the datasets and/or monitorable devices are not normalised across the plurality of locations; generating a user interface based on the datasets, the user interface comprising a primary interface element having a plurality of matrix positions mapped to a surface of a sphere, each of the plurality of matrix positions being associated with one of the plurality of different locations; displaying, in the user interface, an interactive object icon representative of a said monitorable device of each location positioned at the respective matrix position, wherein a scale of each interactive object icon is indicative of the data value of the said monitorable device; in response to receiving a user input at a said interactive object icon, causing a processor to retrieve and display the at least one data value of at least one monitorable device of the location associated with the interactive object icon; determining, based on the interactive object icons, a configuration status of the at least one monitorable device; and configuring the user interface based on the determined configuration status.

One of the main problems of the management of a variety of sites across different locations is that the monitorable devices at each location may not be configured in ways which can be utilised for comparison very easily. The present arrangement advantageously provides a means of identifying anomalous outliers, or incorrect configurations of given monitorable devices with respect to other equivalent monitorable devices, which allows the user to, automatically or otherwise, configure the monitorable device and/or dataset associated therewith such that the user interface can correctly present the information from the dataset via the interactive object icons.

Preferably, the primary interface element may rotate in the user interface automatically to cyclically display all of the plurality of interactive object icons at the respective matrix positions. Said rotation of the primary interface element may be halted upon user interaction therewith.

Optionally, the user interface may comprise at least one selection pane for selecting a monitorable device from a plurality of said monitorable devices, the interactive object icon being indicative of the selected monitorable device.

In one embodiment, the primary interface element may be a user-interactive object.

Preferably, the plurality of matrix positions may be mapped to an outer surface of the primary interface element. Additionally, or alternatively, the plurality of matrix positions may be mapped to an inner surface of the primary interface element. Furthermore, the user interface may be selectably configurable to view the interactive object icons from either the outer surface or the inner surface of the primary interface element.

There may be provided secondary indicia associated with one or more of the interactive object icons which is activatable under predetermined conditions. Preferably, the said predetermined condition may be based on one or more historical dataset from each of a plurality of different locations which is indicative of an anomalous real-time data value.

Optionally, each dataset may be received and updated periodically from the plurality of different locations.

Preferably, an arrangement of the plurality of matrix positions may be correlated with a geographic position of the locations associated therewith.

According to a sixth aspect of the invention, there is provided a computer program product comprising a plurality of computer executable instructions stored on a computer readable storage device, the instructions causing a computer to perform the method of the fifth aspect of the invention.

The invention will now be more particularly described, by way of example only, with reference to the accompanying drawings, in which:

DESCRIPTION OF THE PREFERRED EMBODIMENTS

Figure 1:
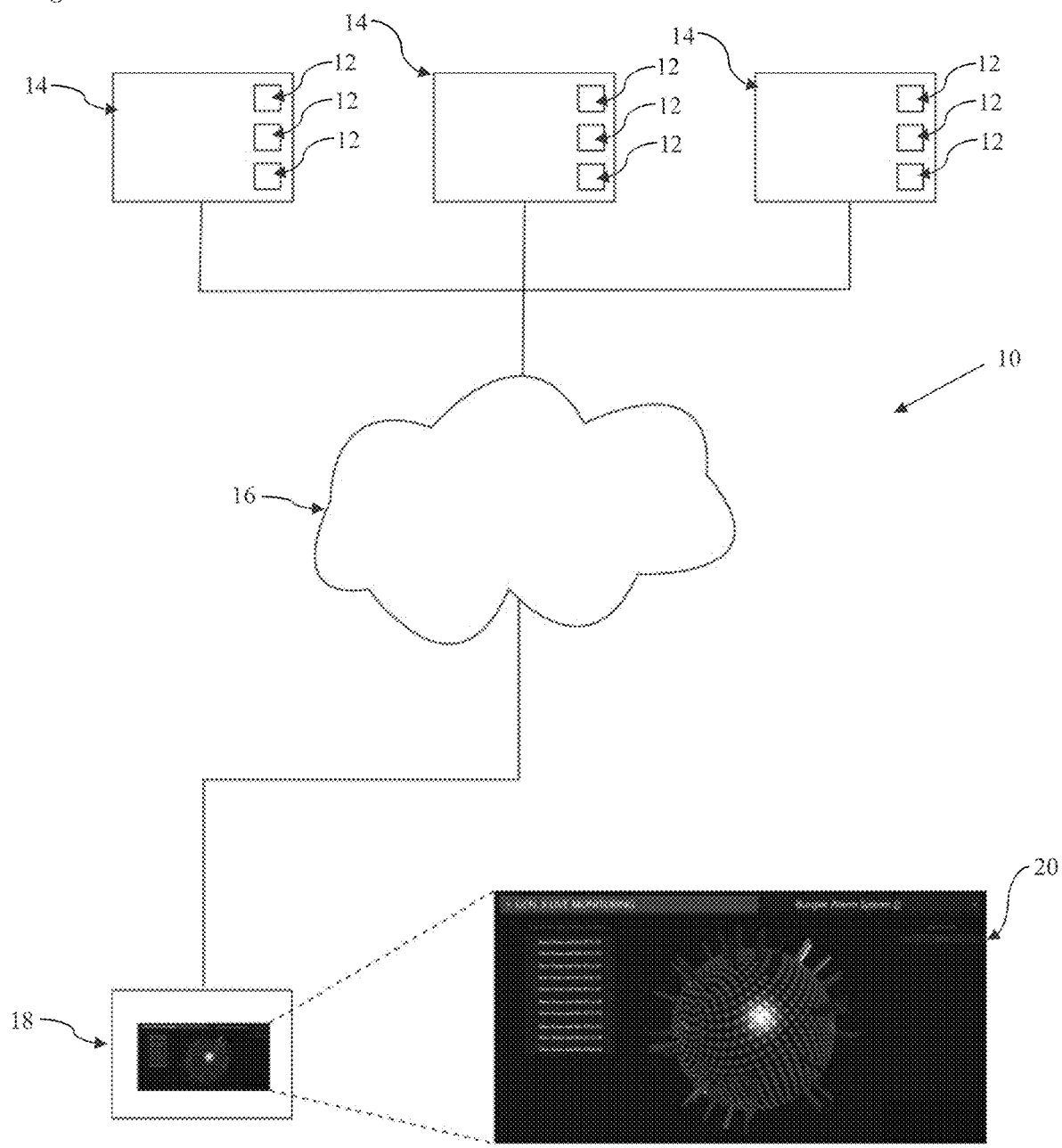
FIG. 1 shows a diagrammatic representation of one embodiment of a dataset management system in accordance with the third aspect of the invention.

Referring to FIG. 1, there is shown a dataset management system, indicated globally at 10, and which is suitable for displaying and controlling datasets associated with monitorable devices 12 at a plurality of different locations 14.

In one preferred embodiment of the invention, the plurality of different locations 14 may be stores or physical locations within a geographically-dispersed business, such as a supermarket or department store chain. However, it will be appreciated that the present dataset management system 10 could conceivably be provided for management of any geographically-dispersed set of monitorable devices. For example, the dataset management system 10 could be used to monitor data from a fleet of haulage trucks, vehicular fleet, plurality of discrete electronic devices across a wireless network, and so on.

The monitorable devices 12 may be any sort of data input or stream which enables data to be accumulated regarding a monitorable characteristic. An exemplary but non-exhaustive list of monitorable devices 12 may include: an alarm device; a temperature sensor; a light sensor; a pressure sensor; a motion sensor; and/or an electronic device having a monitorable activation status.

For at least one, and preferably all of the monitorable devices 12 at each location 14, a dataset can be collected which is indicative of the relevant monitorable characteristic in a quantitative and/or binary and measurable form. For example, a temperature reading could be recorded in the dataset, or an activation or trip status of an alarm device could be recorded. The complete dataset therefore builds a complete picture of the status of the location 14 according to monitorable characteristics of interest to the user. It will be noted that the dataset need not, but could include, all monitorable data which is available from all monitorable devices 12 within each location 14.

There is also provided a central server 16 which is communicatively coupled with each monitorable device 12 so as to receive the dataset from each location 14. This could involve each monitorable device 12 being directly communicable with the central server 16, for example, via wireless connection to each individual monitorable device 12, or each location 14 could include a dedicated local server which collates the dataset for each location 14 and which is separately communicable with the central server 16.

Preferably, the central server 16 is a cloud-based networking server, which negates the need for the user to host a separate server of their own. However, the central server 16 could just as readily be a traditional local server.

Data transmission between the monitorable devices 12 and the central server 16 may be periodic, for example occurring every five to thirty minutes, or alternatively could be updatable in real-time, via constant communications between the monitorable devices 12 and the central server 16. In a preferred embodiment, the dataset may be updated periodically, and sent from the monitorable devices 12 to the central server periodically, and, in the event that a critical event is detected, such as an alarm trigger, the update of the dataset and subsequent transmission to the central server 16 may be automatically prioritised. Alternatively, certain events, such as alarm triggers, could be given prioritised and therefore real-time updates, whilst other, less critical monitorable characteristics, such as ambient temperature, could then be updated only periodically.

The central server 16 is communicatively coupled, either via a wired or wireless communication means, with a user device 18 from which a user utilising the dataset management system 10 can control the dataset management system 10. The interaction between the user and the dataset management system 10 is provided by a user interface 20 which can be displayed on the user device 18. The user device 18 is preferably a personal computer, such as a desktop, laptop or tablet device, but could just as easily be a smartphone or similar mobile computing device, for example.

A primary interface element 22 of the user interface 20 is a sphere comprising a plurality of matrix positions mapped on its surface, which could be either an outer or an inner surface of the sphere, depending on a display angle of the primary interface element 22. Each of the matrix positions are provided with an associated to one of the locations 14, and therefore the total number of matrix positions on the primary interface element 22 should therefore equal a total number of locations 14. It will be appreciated, however, that there could be some filtering of locations 14 with which the user would like to interact, and therefore the total number of matrix positions could be adaptive and/or less than the total number of locations 14. The dataset in use will inform the population of the matrix positions, adjusting the scale and/or spacing of the surface of the sphere of the primary interface element 22.

Preferably, the primary interface element 22 rotates in the user interface 20, optionally about a polar axis thereof, automatically to cyclically display all of the plurality of interactive object icons 24 at the respective matrix positions, thereby allowing the user to identify and access the interactive object icons 24 in a smaller space than would be achievable with a standard database. User interaction with the primary interface element 22, preferably at a position which is not within a certain and predetermined distance from a matrix position, may beneficially allow the user to halt this automatic rotation.

In a preferred embodiment, the matrix positions may be equally spaced about the surface of the primary interface element 22, which provides a visually-appealing spherical user interface 20. However, it will be appreciated that the matrix positions could be co-ordinated with further data associated with specific locations 14. For instance, the arrangement of the matrix positions could be correlated with, for example, a geographic location of the locations 14.

Associated with and positioned at each matrix position is an interactive object icon 24 which is representative of a monitorable device 12 associated with the respective location 14. In the present embodiment, each interactive object icon 24 is presented as a scalable icon on the surface of the primary interface element 22, an aspect of which is indicative of the value of the monitorable characteristic received by the monitorable device 12. Here, this is represented as a height of the interactive object icon 24 relative to the surface of the primary interface element 22.

Secondary indicia may also be provided which are activatable under the triggering of one or more predetermined criteria associated with the monitorable characteristic. In the present example, where a value of the monitorable characteristic has passed a predetermined threshold, a colour of the interactive object icon 24 could be adjusted.

The interactive object icon 24 is user-interactable via the user device 18, for example, via selection of the interactive object icon 24 via a cursor selection in the user interface 20. Selection of the interactive object icon 24 causes a processor, which may be the processor of the user device 18 or the central server 16, to retrieve and display at least one data value associated with the monitorable device 12 associated with the interactive object icon 24 via a display to the user.

The interaction of the user with the interactive object icon 24 permits the user access to control functionality of the dataset management system 10. Preferably, the dataset management system 10 is configured such that a user can interact with the interactive object icon 24 for a given monitorable device 12 at a location 14 and in turn access and control the monitorable device 12, thereby performing a physical function at the location 14. For example, where the monitorable characteristic is an alarm trigger status, the user may be able to select the relevant interactive object icon 24, which has been scaled in accordance with a quantifiable characteristic of the alarm, such as number of registered trigger events, and then subsequently interact with the monitorable device 12. This could therefore provide a mechanism for remote override of the alarm functionality.

Figure 2:
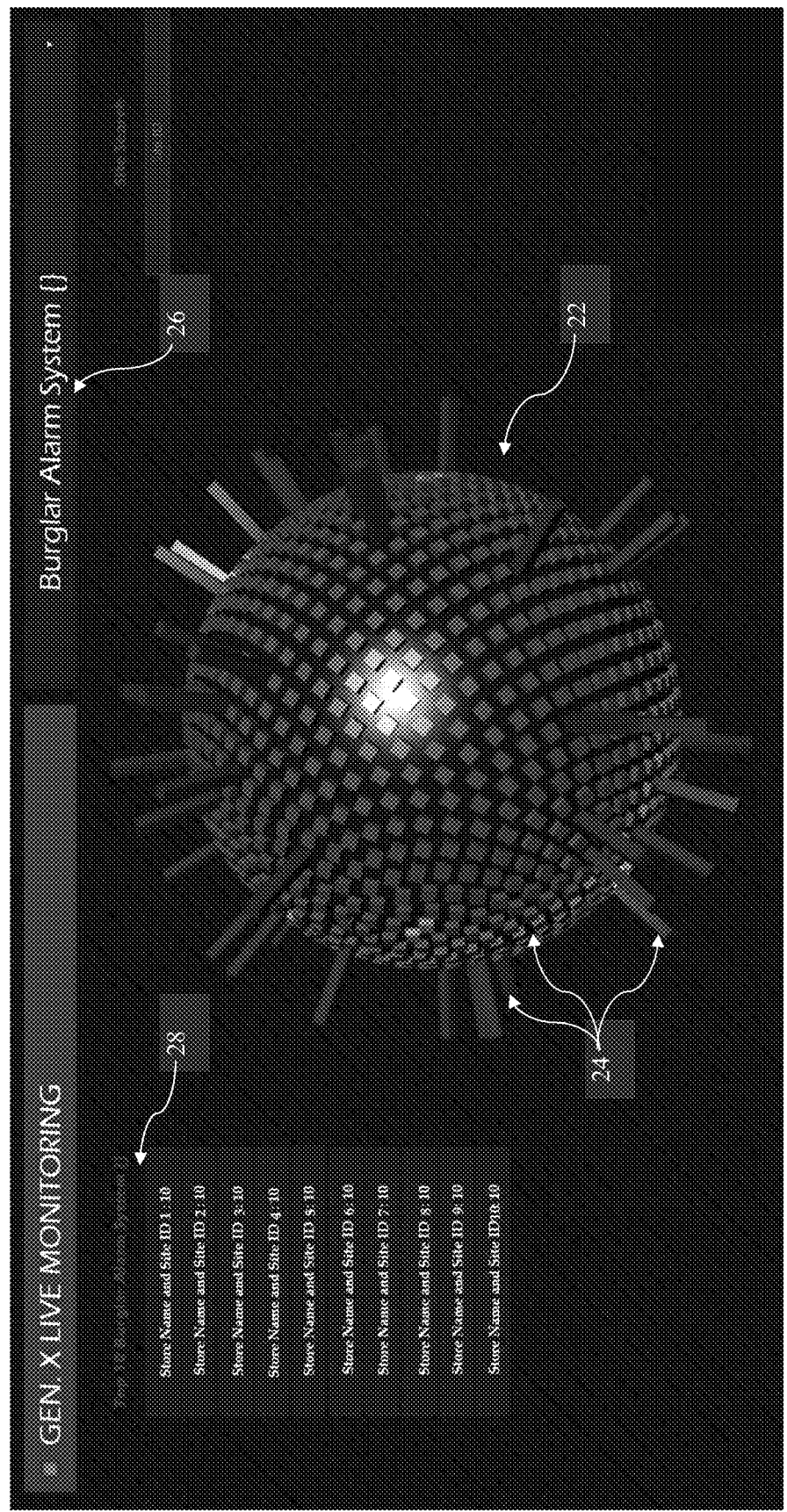
FIG. 2 shows one embodiment of a user interface of the dataset management system of FIG. 1.

An indicative first screen of the user interface 20 is illustrated in FIG. 2. The primary interface element 22 is positioned centrally, and the user is readily able to interact with the interactive object icons 24 thereof.

Figure 3:
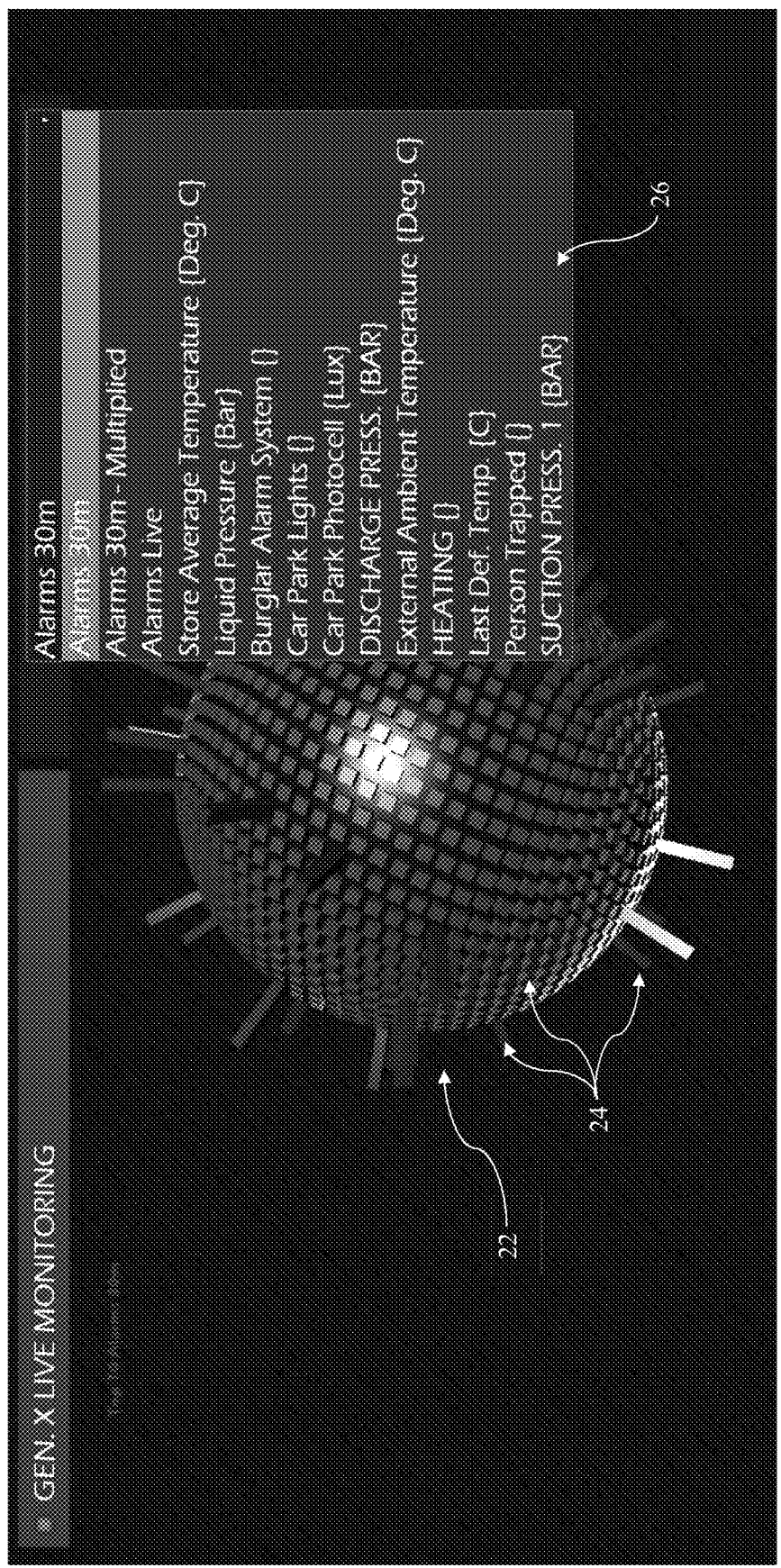
FIG. 3 shows the user interface of FIG. 2, inclusive of a selection pane.

The user interface 20 preferably further includes a selection pane 26 with which the user can interact, and activation of the selection pane 26 can be seen in FIG. 3. The selection pane 26 may be configured to allow the user to select a specific type of monitorable device 12, such as an alarm system, from which data values are utilised in the generation of the primary interface element 22, and further allows the user to switch between different types of monitorable device 12 to be retrieved and displayed across the entire range of locations 14.

The user interface 20 may also be provided having an indicator pane 28 which is indicative of selected matrix positions and/or or locations 14. This may, for example, be a listing of the most significant values returned from the monitorable devices 12 at the relevant locations 14. The indicator pane 28 may provide the user with a quick means of accessing said critical matrix positions for subsequent interaction therewith.

Figure 4:
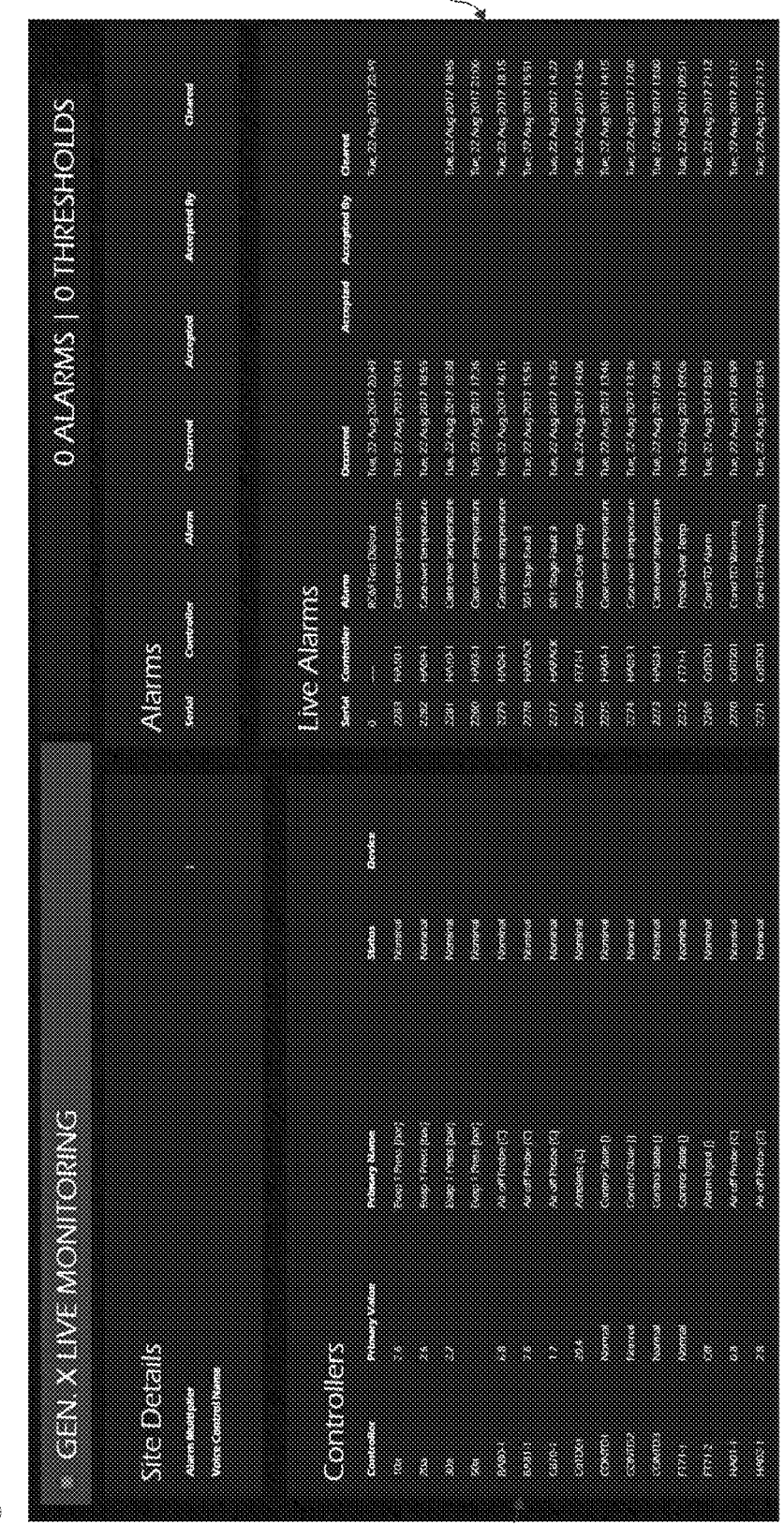
FIG. 4 shows a further user interface of the dataset management system of FIG. 1.

FIG. 4 shows a possible user interface 20 screen which may be displayed following user interaction with an interactive object icon 24 of the primary interface element 22. There may be a display of relevant information associated with the respective monitorable device 12 and/or location 14 associated with the interactive object icon 24, and historical data associated with the or each monitorable device 12 at the location 14 could be indicated. In the depicted user interface 20, a plurality of data values associated with alarm triggers is shown, and the number of triggers above a certain threshold limit can also be flagged.

The user interface 20 may therefore include a control functionality panel 30, via which the user may access control functionality associated with monitorable devices 12, and may also include an event indicator panel 32, which may log and display relevant events associated with the monitorable device and/or devices 12.

If historical data associated with the or each monitorable device 12 at the location 14 is provided, then this information could be utilised to automatically detect and alert the user to real-time anomalous occurrences. For instance, it may be expected that an alarm event is triggered in a shop, accidentally or otherwise, at opening or closing times. The historical data may therefore be able to determine and categorise a severity of an alarm event based on historical data, allowing the user to more readily identify events which are anomalous and therefore potentially more problematic. The interactive object icon 24 could therefore be modified based on the result of categorisation of any given event, based on the historical data. For example, the scale of the interactive object icon 24 could be altered based on a further modifier which is calculated based on the historical data.

The dataset management system 10 allows the user to interact with and preferably control the monitorable devices 12 at the various locations 14. This can provide the user with a method of remotely controlling at least one device 12 at a respective location 14, which comprises the steps of receiving a dataset from each of the plurality of different locations 14, with each dataset comprising at least one data value of at least one monitorable device 12 at the respective location 14. The user interface 20 is then generated based on the dataset, with the user interface 20 comprising the primary interface element 22 having the plurality of matrix positions mapped to a surface of a sphere, each of the plurality of matrix positions being associated with one of the plurality of different locations 14.

In the user interface 20, an interactive object icon 24 is displayed which is representative of a said monitorable device 12 of each location 14 positioned at the respective matrix position, and the scale of each interactive object icon 24 is indicative of the data value of the said monitorable device 12. In response to receiving a user input at a said interactive object icon 24, a processor, preferably of either the user device 18 or central server 16 retrieves and displays the at least one data value of at least one monitorable device 12 of the location 14 associated with the interactive object icon 24. This permits control of a said device 12 at the location 14 to perform a physical function at the location 14.

One problem accompanying this technique, however, is that the monitorable devices 12 across the network are not necessarily configured in corresponding fashions, despite being used for corresponding purposes at each location 14. However, the dataset management system 10 allows for the monitorable devices 12 and/or their associated datasets to be normalised for modification of the respective interactive object icons 24.

This can be achieved by configuring the user interface 20 based on the plurality of locations 14 to be monitored. A dataset is received from each of the plurality of different locations 14, each dataset comprising at least one data value of at least one monitorable device 12 at the respective location 14, wherein the datasets and/or monitorable devices 12 are not normalised across the plurality of locations 14.

As normal, the user interface 20 can be generated based on the datasets, the user interface comprising the primary interface element 22 having a plurality of matrix positions mapped to a surface of a sphere, each of the plurality of matrix positions being associated with one of the plurality of different locations 14. The interactive object icons 24 for each monitorable device 12 is then displayed having been scaled in accordance with the data values in the datasets.

Subsequently, in response to receiving a user input at a said interactive object icon 24, a processor retrieves and displays the at least one data value of the monitorable device 12 of the location 14 associated with the interactive object icon 24, and, based on the interactive object icons 24, a configuration status can be determined for the at least one monitorable device 12. The user interface 20 can then be configured based on the determined configuration status.

This configuration status may be most apparent for binary statuses, such as an activation or trigger status of an alarm system. For example, some alarm systems may record a triggered status as a '0' in its local memory, whereas others might record this as '1'. From a remote location, it is difficult to determine which configuration status is in effect at any given time. The user interface 20 of the present dataset management system 10 provides a mechanism by which conflicting configuration statuses across a network can be identified, and then in turn remotely configured, either by a user, or automatically. Automatic modification of the configuration statuses could be achieved with reference to historical data or trends from a given location 14, which may be indicative of an exemplary status of the monitorable device 12.

It may also be feasible that one or more further monitorable device 12 at each location 14 is could be used to reference a monitorable device 12 so as to improve identification of a configuration status of the monitorable device 12. The further monitorable devices 12 could conceivably be video or image capture devices positioned at the location 14 which can feed back live or periodic footage of the monitorable device 12 to be configured to the remote user.

It is therefore possible to provide a dataset management system which is capable of permitting a user who is remote to a plurality of different locations having monitorable devices to either control or configure the monitorable devices and/or datasets associated therewith. This is achieved via a user interface which improves the visualisation and interaction with the data values associated with the monitorable characteristics of the monitorable devices via interactive object icons. This is achieved in a spherical viewing environment, enabling ready user interaction capability.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

What is claimed is:

1. A dataset management system comprising:
at least one monitorable device positioned at each of a plurality of different locations;
a server remote to the said plurality of different locations which is communicatively coupled with each monitorable device, the server being configured to receive a dataset from each of the said plurality of different locations, each dataset comprising a multiple data value set having data values monitored by the at least one monitorable device;
a user device remote to the said plurality of different locations which is communicatively coupled with the server, the user device being adapted to display a user interface based on the dataset,
the user interface comprising:
a primary interface element having a plurality of matrix positions mapped to a surface of a sphere, the plurality of matrix positions being equally spaced about the surface of the primary interface element; and
a selection pane configured to select one monitorable device type of a plurality of different types of monitorable device,
each of the plurality of matrix positions being associated with one of the said plurality of different locations,
the user interface having interactive object icons which are representative of monitorable devices positioned at the respective matrix position, said monitorable devices correspond to the one selected type of monitorable device as defined in the selection pane, wherein a scale of each of the interactive object icons is indicative of a number of triggered alarm events being monitored for one monitorable device of said monitorable devices and further modified based on historical data;

a processor configured to retrieve and display, in response to receiving a user input on one interactive object icon, the data value being monitored of the at least one monitorable device of the location associated with the interactive object icon;

the user device, via the user interface, allowing a user to, based on the selected type of monitorable device in the selection pane, selectably remotely control a said monitorable device at the location so that the monitorable device performs a physical function at the location.

2. The dataset management system as claimed in claim 1, wherein the plurality of different types of monitorable device is selected from: an alarm device; a temperature sensor; a light sensor; a pressure sensor; a motion sensor; and/or an electronic device having a monitorable activation status.

3. The dataset management system as claimed in claim 1, wherein the primary interface element rotates in the user interface automatically to cyclically display all of the plurality of interactive object icons at the respective matrix positions.

4. The dataset management system as claimed in claim 3, wherein the rotation of the primary interface element is halted upon user interaction therewith.

5. The dataset management system as claimed in claim 1, wherein the user interface comprises at least one selection pane for selecting a monitorable device from a plurality of said monitorable devices, the interactive object icon being indicative of the selected monitorable device.

6. The dataset management system as claimed in claim 1, wherein the primary interface element is a user-interactive object.

7. The dataset management system as claimed in claim 1, wherein the plurality of matrix positions is mapped to an outer surface of the primary interface element.

8. The dataset management system as claimed in claim 1, wherein the plurality of matrix positions is mapped to an inner surface of the primary interface element.

9. The dataset management system as claimed in claim 1, wherein the plurality of matrix positions is mapped to either an outer surface or an inner surface of the primary interface element, and wherein the user interface is selectably configurable to view the interactive object icons from either the outer surface or the inner surface of the primary interface element.

10. The dataset management system as claimed in claim 1, further comprising secondary indicia associated with one or more of the interactive object icons which is activatable under predetermined conditions.

11. The dataset management system as claimed in claim 10, wherein the said predetermined condition is based on one or more historical dataset which is indicative of an anomalous real-time data value.

12. The dataset management system as claimed in claim 1, wherein each dataset is received and updated periodically from the plurality of different locations.

* * * * *